(12) United States Patent
Shibata et al.

(10) Patent No.: US 7,685,717 B2
(45) Date of Patent: Mar. 30, 2010

(54) METHOD FOR MANUFACTURING A BEARING RACEWAY MEMBER

(75) Inventors: Masamichi Shibata, Mie (JP); Nobuo Komeyama, Nara (JP); Hisashi Harada, Kashiwara (JP)

(73) Assignee: JTEKT Corporation, Osaka (JP)

( * ) Notice: Subject to any disclaimer, the term of this patent is extended or adjusted under 35 U.S.C. 154(b) by 1361 days.

(21) Appl. No.: 10/514,115

(22) PCT Filed: May 14, 2003

(86) PCT No.: PCT/JP03/06032

§ 371 (c)(1),
(2), (4) Date: Apr. 8, 2005

(87) PCT Pub. No.: WO03/095855

PCT Pub. Date: Nov. 20, 2003

(65) Prior Publication Data

US 2005/0160602 A1      Jul. 28, 2005

(30) Foreign Application Priority Data

May 14, 2002  (JP) ............................. 2002-138970
May 14, 2002  (JP) ............................. 2002-138971
Sep. 24, 2002  (JP) ............................. 2002-277535

(51) Int. Cl.
B21D 53/10  (2006.01)
B21K 1/04   (2006.01)
B21C 37/30  (2006.01)

(52) U.S. Cl. .............................. 29/898.066; 29/898.13; 29/90.01

(58) Field of Classification Search ............ 29/898.066, 29/898.067, 898.13, 90.01; 384/564, 569, 384/571

See application file for complete search history.

(56) References Cited

U.S. PATENT DOCUMENTS 4,696,581 A * 9/1987 Tsushima et al. .......... 384/565
5,336,338 A * 8/1994 Toda .......................... 148/319

(Continued)

FOREIGN PATENT DOCUMENTS

JP        59-219121 A      12/1984

(Continued)

OTHER PUBLICATIONS

F Klocke et al., "Roller Burnishing of Hard Turned Surfaces," Int J Mach Tools Manufact. vol. 38, Nos. 5-6, pp. 419-423, 1998.

(Continued)

Primary Examiner—David P Bryant
Assistant Examiner—Sarang Afzali
(74) Attorney, Agent, or Firm—Birch, Stewart, Kolasch & Birch, LLP (57) ABSTRACT

At least a race (1c) of a blank (B) for forming a bearing raceway member is hardened by heating and is finished to predetermined precisions. Subsequently, the race (1c) is roller burnished for additional hardening. The blank (B) is formed from a steel for bearing manufacture and is subjected to the roller burnishing, thereby achieving a hardness of HRC65 or more at a surface of the race (1c), and a center-line average roughness Ra of 0.1 μm or less at the surface of the race (1c) and achieving a hardness of HRC60 or more at the depth of at least 0.2 mm from the surface of (1c).

2 Claims, 10 Drawing Sheets

U.S. PATENT DOCUMENTS 5,863,239 A * 1/1999 Barton, II .................... 451/65

FOREIGN PATENT DOCUMENTS

| JP | 61-235509 A | 10/1986 |
| JP | 11557/1991 A | 2/1991 |
| JP | 3-199716 A | 8/1991 |
| JP | 4-308038 A | 10/1992 |
| JP | 5-195069 A | 8/1993 |
| JP | 5-195070 A | 8/1993 |
| JP | 05-195070 A | 8/1993 |
| JP | 5-240253 A | 9/1993 |
| JP | 8-19961 A | 1/1996 |
| JP | 9-137854 A | 5/1997 |
| JP | 10-138128 A | 5/1998 |
| JP | 11-151904 A | 6/1999 |
| JP | 2000-190216 A | 7/2000 |
| JP | 2001-12475 A | 1/2001 |
| JP | 2001-105309 A | 4/2001 |
| JP | 2002-168256 A | 6/2002 |
| JP | 2002-220638 A | 8/2002 |

OTHER PUBLICATIONS

Partial translation of JP-10-138128-A.
Partial translation of JP-61-235509-A.

* cited by examiner

METHOD FOR MANUFACTURING A BEARING RACEWAY MEMBER

TECHNICAL FIELD

The present invention relates to a method for manufacturing a bearing race member constituting a roller bearing or a spider joint (cross joint).

BACKGROUND ART

As to a roller bearing for use in a clean oil or an oil contaminated with foreign substances (extraneous matter), or in grease lubrication, it is a common practice to subject a raceway member (race) thereof to a surface heat-treatment/hardening process, such as carburizing, nitriding or induction hardening, in order to extend the service life of a race thereof (see, for example, Japanese Unexamined Patent Publication No. 5-195070). For the purpose of increasing the longevity of the bearing used in the clean oil, in particular, various attempts have been made to increase the strength of the race by decreasing a content of a non-metal inclusion in the material, adding an alloy component or the like (see, for example, Japanese Unexamined Patent Publication No. 2002-220638). However, all of the aforementioned measures have a drawback of increasing the manufacture costs of the roller bearing.

Steels for bearing manufacture, such as bearing steels and carburized steels, have been used as a common material for the raceway member of the roller bearing. However, the steel for bearing manufacture is so expensive that the manufacture cost of the roller bearing is high. On this account, some bearing manufacturers adopt a method wherein the raceway member is formed from a relatively less expensive carbon steel for machine structural use, such as JIS-S45C and JIS-S55C. In this case, however, the race is inferior in the quenched hardness as compared with that of the steel for bearing manufacture, failing to achieve a sufficient fatigue strength. Hence, the raceway member suffers a short service life.

In some medium- or large-sized roller bearings having an outside diameter of 240 mm or more, on the other hand, a blank for raceway member is heat-treated and then, the race is finished to predetermined precisions by turning rather than by grinding. In this case, however, the resultant race has such a great surface roughness (e.g., a center-line average roughness Ra of 0.35 µm or more) that the race inevitably encounters boundary lubrication at its contact portion with a rolling element. Furthermore, the race is subjected to the heavy cutting process, which involves a potential risk of producing tensile residual stress at the race. Therefore, if the race is used in contact with the rolling element at high surface contact pressure, the race is more susceptible to premature flaking. In an attempt at further improving the finished surface (e.g., Ra≧0.2 µm) of the race formed by the aforesaid cutting process, the cutting conditions may be loosened (the race cut relatively lightly) or otherwise, the finished surface may be subjected to rough grinding. Such approaches also encounter the aforementioned problems.

In view of the foregoing, the invention has been accomplished and has an object to provide a method for manufacturing a bearing raceway member, which can extend the service life of the bearing raceway member at low costs.

DISCLOSURE OF THE INVENTION

According to a first aspect of the invention, a method for manufacturing a bearing raceway member comprises the steps of: working a material for producing a blank for forming a bearing raceway member having an annular race; hardening by heating at least the race of the blank; finishing the race of the blank hardened by heating to predetermined precisions; and roller burnishing the finished race thereby hardening the race, and is characterized in that a steel for bearing manufacture is used as the material, and that the race is subjected to the roller burnishing, thereby achieving a hardness of HRC65 or more at a surface thereof and a center-line average roughness Ra of 0.1 µm or less at the surface thereof.

According to the first aspect of the invention, the surface of the race has the hardness of HRC65 or more and the center-line average roughness Ra of 0.1 µm or less. Because of these features coupled with a fact that the roller burnishing produces compressive residual stress in the race, the race can be increased in the fatigue strength. Hence, the service life of a roller bearing can be extended at low costs.

According to the first aspect of the invention, it is preferred that the roller burnished race has a compressive residual stress of 1000 MPa or more at depth of at least 0.15 mm from the surface thereof. In this case, the fatigue strength of the race can be increased more effectively.

According to the first aspect of the invention, it is preferred that the race is hardened by the roller burnishing, thereby achieving a hardness of HRC60 or more at depth of at least 0.2 mm from the surface thereof. In this case, the fatigue strength of the race can be increased even more effectively.

According to a second aspect of the invention, a method for manufacturing a bearing raceway member comprises the steps of: working a material for producing a blank for forming a bearing raceway member having an annular race; hardening by heating at least the race of the blank; finishing the race of the blank hardened by heating to predetermined precisions; and roller burnishing the finished race thereby hardening the race, and is characterized in that a carbon steel for machine structural use is used as the material, and that the race is hardened by the roller burnishing, thereby achieving a hardness of Hv800 or more at depth of at least 0.2 mm from the surface thereof.

According to the second aspect of the invention, the race of the raceway member is subjected to the roller burnishing so as to achieve the hardness of Hv800 or more at depth of at least 0.2 mm from the surface thereof. Thus, the roller burnishing produces compressive residual stress in the race. Because of this features coupled with an improved surface roughness of the race, the raceway member can achieve a higher fatigue strength than the conventional product which is not roller burnished. Thus is extended the service life of the raceway member.

According to the second aspect of the invention, it is preferred to use a steel having a carbon content of 0.42 wt % or more as the carbon steel for machine structural use. In this case, the raceway member can exhibit fatigue strength substantially comparable to that of the conventional raceway member formed from the bearing steel.

According to the second aspect of the invention, it is preferred that the race is subjected to the roller burnishing, thereby achieving a compressive residual stress of 800 MPa or more at depth of at least 0.15 mm from the surface thereof. In this case, the raceway member of the invention can be increased in the fatigue strength more effectively as compared with the conventional products.

According to a third aspect of the invention, a method for manufacturing a bearing raceway member for use under a condition that the raceway member is in contact with a rolling element at a maximum contact surface pressure of 300 MPa or more, comprises the steps of: working a material for producing a blank for forming a bearing raceway member having an annular race; hardening by heating at least the race of the blank; finishing the race of the blank hardened by heating to predetermined precisions; and roller burnishing the finished race thereby hardening the race, and is characterized in that the finishing process comprises turning a surface of the race to a center-line average roughness Ra of 0.35 µm or more, and that the race is subjected to the roller burnishing, thereby achieving a center-line average roughness Ra of 0.25 µm or less at the surface thereof, and a compressive residual stress of 1000 MPa or more at depth of at least 0.2 mm from the surface thereof.

According to the third aspect of the invention, the surface of the race is roller burnished so as to achieve the center-line average roughness Ra of 0.25 µm or less. Hence, the raceway member is adapted to maintain a favorable lubrication between the race and the rolling element even if the raceway member is used under the condition that the raceway member is in contact with the rolling element at the maximum contact surface pressure of 300 MPa or more. Furthermore, the race has the compressive residual stress of 1000 MPa or more at depth of at least 0.2 mm from the surface thereof. This eliminates a potential risk of the race sustaining tensile residual stress. Thus, the service life of the bearing raceway member can be extended.

According to a fourth aspect of the invention, a method for manufacturing a bearing raceway member for use under a condition that the raceway member is in contact with a rolling element at a maximum contact surface pressure of 300 MPa or more, comprises the steps of: working a material for producing a blank for forming a bearing raceway member having an annular race; hardening by heating at least the race of the blank; finishing the race of the blank hardened by heating to predetermined precisions; and roller burnishing the finished race thereby hardening the race, and is characterized in that the finishing process comprises turning or grinding a surface of the race to a center-line average roughness Ra of 0.35 µm or more, and that the race is subjected to the roller burnishing, thereby achieving a center-line average roughness Ra of 0.15 µm or less at the surface thereof, and a compressive residual stress of 1000 MPa or more at depth of at least 0.2 mm from the surface thereof.

According to the method for manufacturing the bearing raceway member, the surface of the race is roller burnished so as to achieve the center-line average roughness Ra of 0.15 µm or less. Hence, the raceway member is adapted to maintain a favorable lubrication between the race and the rolling element even if the raceway member is used under the condition that the raceway member is in contact with the rolling element at the maximum contact surface pressure of 300 MPa or more. Furthermore, the race has the compressive residual stress of 1000 MPa or more at depth of at least 0.2 mm from the surface thereof. This eliminates the potential risk of the race sustaining tensile residual stress. Thus, the service life of the bearing raceway member can be extended.

According to the third or fourth aspect of the invention, it is preferred that the race is hardened by the roller burnishing, thereby achieving a hardness of Hv700 or more at depth of at least 0.2 mm from the surface thereof. Thus, the fatigue strength of the race can be increased effectively.

BEST MODES FOR CARRYING OUT THE INVENTION

First Embodiment

Figure 1:
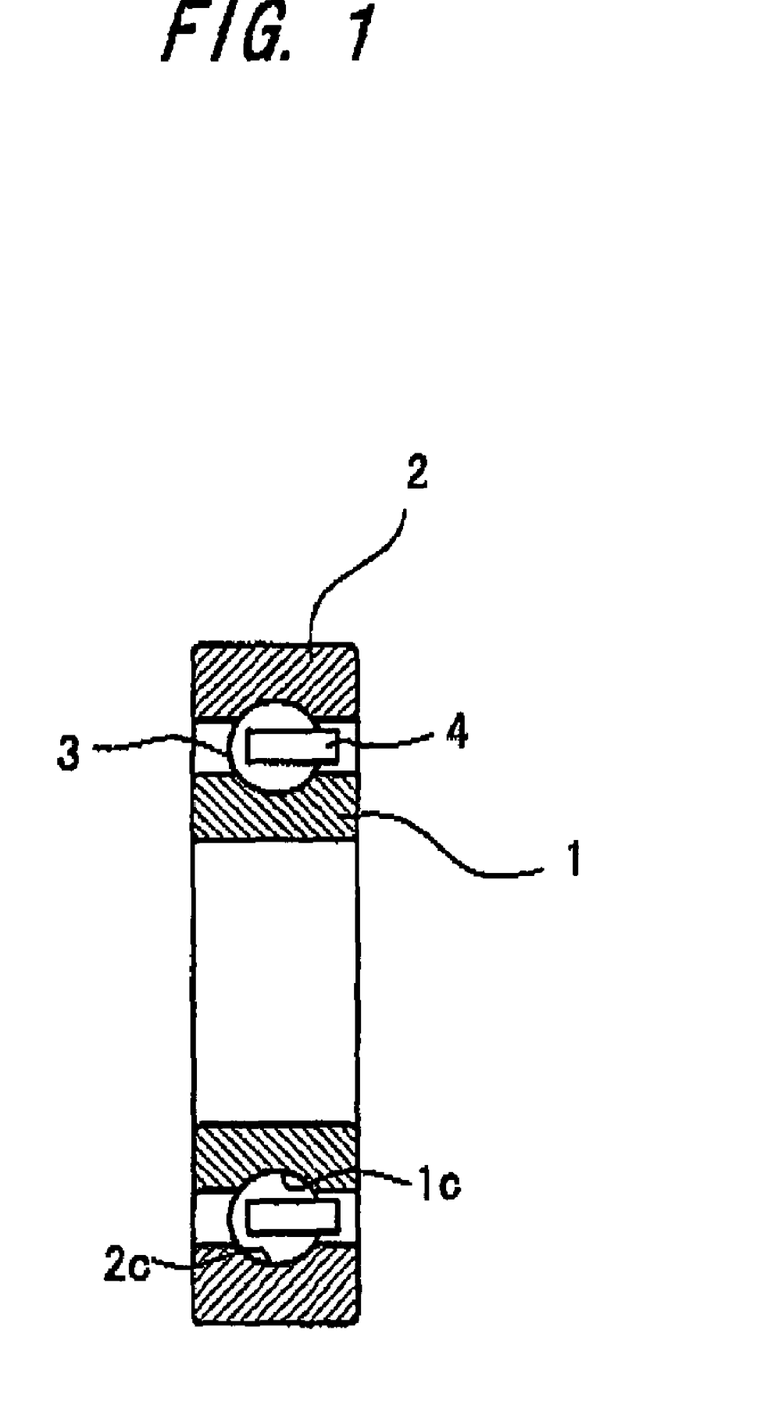
FIG. 1 is a sectional view showing a roller bearing fabricated using a method for manufacturing a bearing raceway member according to a first embodiment of the invention.

A roller bearing shown in FIG. 1 is fabricated using a method for manufacturing a bearing raceway member according to the invention. The roller bearing is arranged such that a plurality of balls 3 as a rolling element are interposed between an inner ring 1 and an outer ring 2 as raceway members coaxially arranged, and that the individual balls 3 are retained at equal space intervals by means of a cage 4. The inner ring 1 and the outer ring 2 are formed from a bearing steel, such as SUJ-2 (JIS Standards), which is hardened by heat treatment. Annular races 1c, 2c of the rings have a surface hardness of HRC65 or more, and a center-line average surface roughness Ra of 0.1 µm or less. The races 1c, 2c have a compressive residual stress of 1000 MPa or more at depth of at least 0.15 mm from the surfaces thereof, and a hardness of HRC60 or more at depth of at least 0.2 mm from the surfaces thereof.

Figure 2:
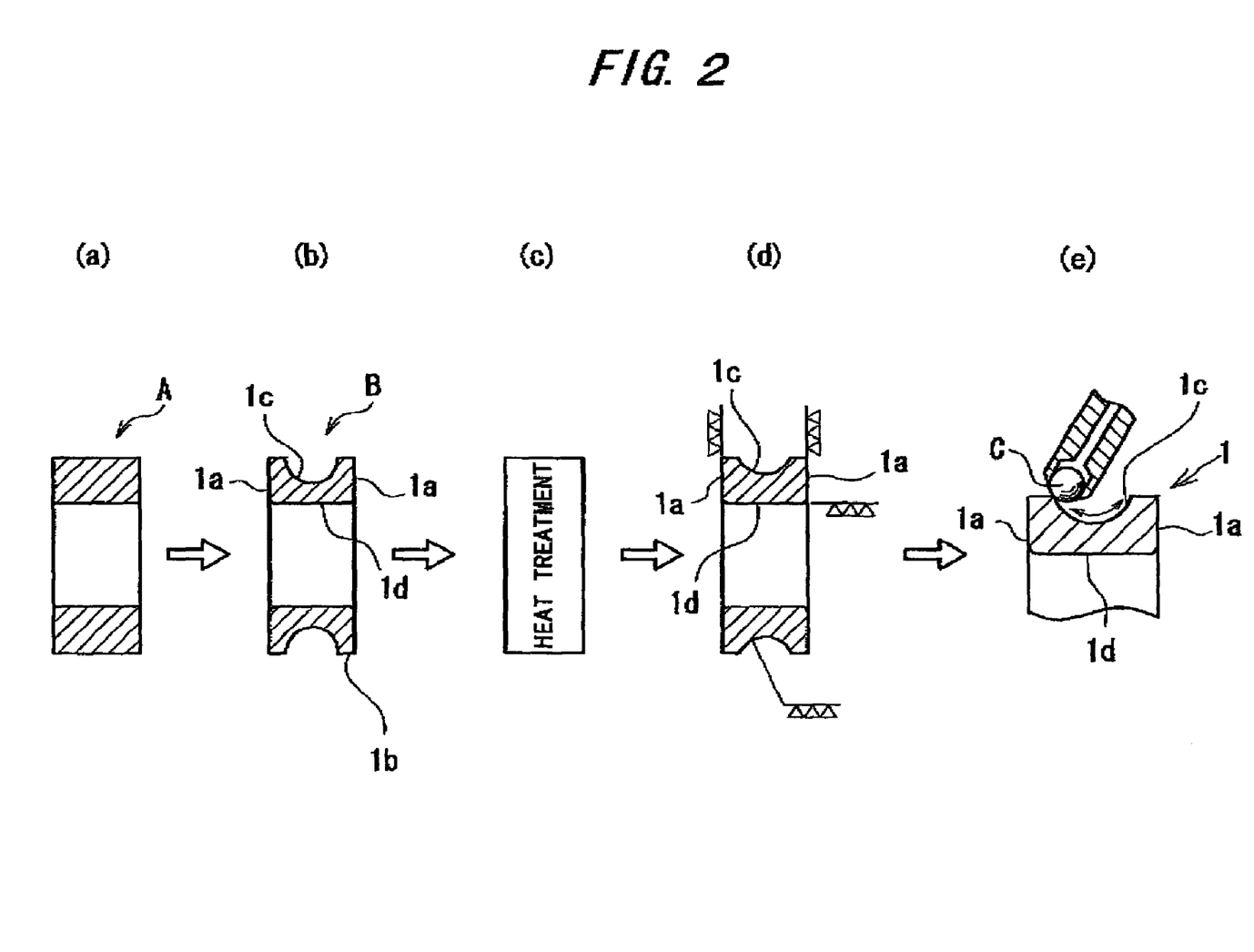
FIG. 2 is a group of diagrams showing the steps of the method for manufacturing the bearing raceway member according to the first embodiment of the invention.

The inner ring 1 of the roller bearing is manufactured as follows. First, an annular material A (see FIG. 2(a)) is cut by turning whereby an end face 1a, an outer periphery 1b, the race 1c, an inner periphery 1d and the like are formed into predetermined shapes, respectively (see FIG. 2(b)). Next, a blank B thus shaped by turning is subjected to a so-called bulk heat treatment so as to be hardened to a hardness of say HRC60 to HRC63 (see FIG. 2(c)). Thereafter, the end faces 1a, the race 1c and the inner periphery 1d of the blank 3 thus heat treated are finished by grinding to predetermined precisions (see FIG. 2(d)).

When the grinding process is completed, a surface of the race 1c is roller burnished (see FIG. 2(e)). The roller burnishing is accomplished by moving a mirror-surfaced ceramic ball C along an axial sectional face of the race 1c as holding the ball in rolling contact therewith, the ball pressed against the race 1c with high pressure. In the roller burnishing process, burnishing conditions including the burnish amount, the pressure to be applied and the like are so selected as to allow the race 1c to achieve a hardness of HRC65 or more; a center-line average surface roughness Ra of 0.1 μm or less; a compressive residual stress of 1000 MPa or more at depth of at least 0.15 mm from the surface thereof; and a hardness of HRC60 or more at depth of at least 0.2 mm from the surface thereof.

Figure 3:
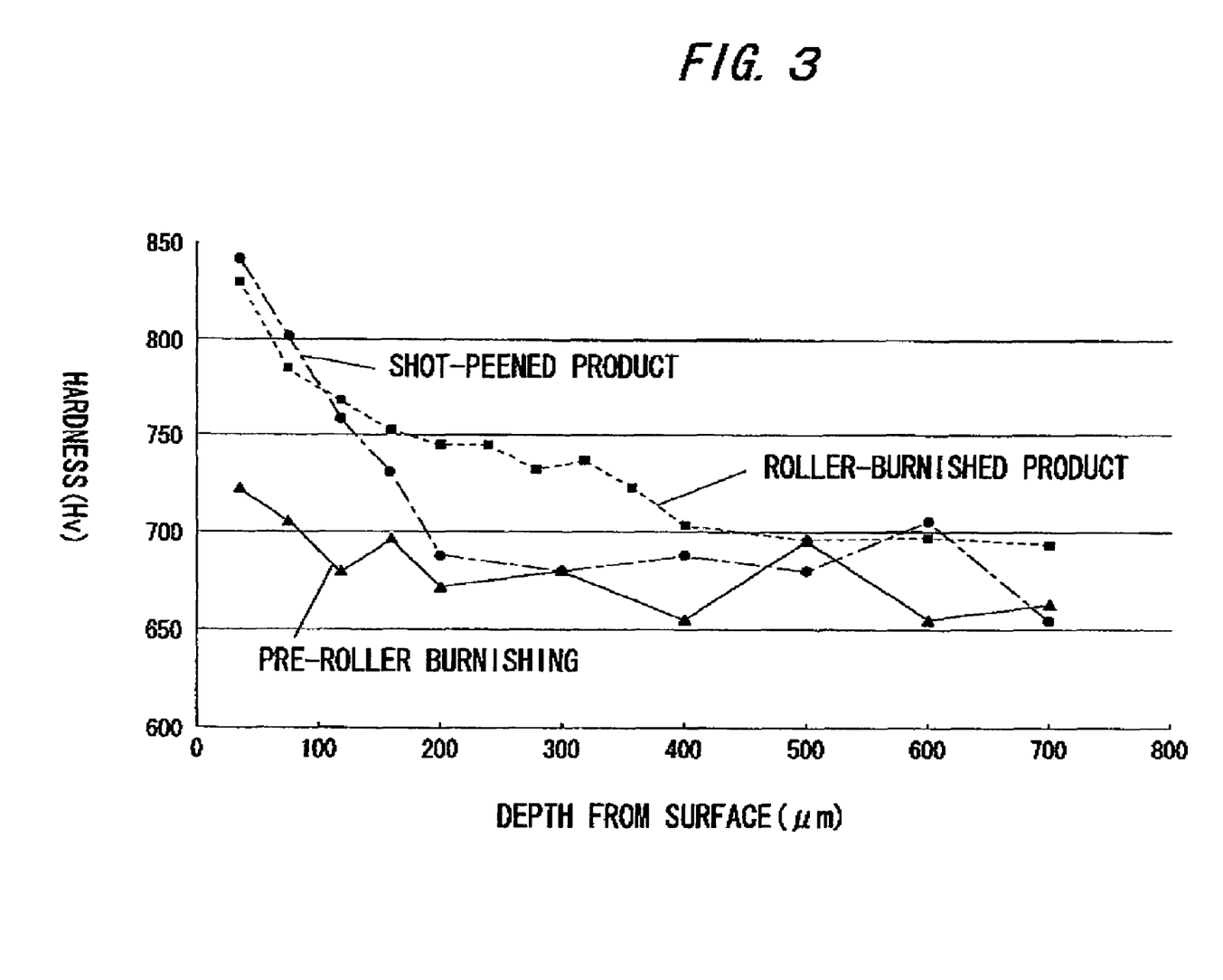
FIG. 3 is a graphical representation of measurement results of the hardness of an inner race of the roller bearing as determined at individual depths from a surface of the inner race.

FIG. 3 is a graphical representation of measurement results of the hardness of the race 1c as determined at individual depths from the surface thereof after the aforementioned roller burnishing process. For comparison purpose, the figure also shows measurement results of the hardness of the race un-subjected to the roller burnishing and those of a race finished by turning and then shot peened.

As apparent from FIG. 3, the roller burnished race 1c achieves a hardness of Hv840 (HRC65.3) or more at its portion near the surface. In addition, the race 1c achieves a hardness of Hv700 (HRC60.1) or more at depth of at least 0.2 mm from the, surface thereof. Thus, the race 1c is dramatically increased in the hardness at the 0.2 mm-depth thereof as compared with the race un-subjected to the roller burnishing or the race subjected to the shot peening.

Figure 4:
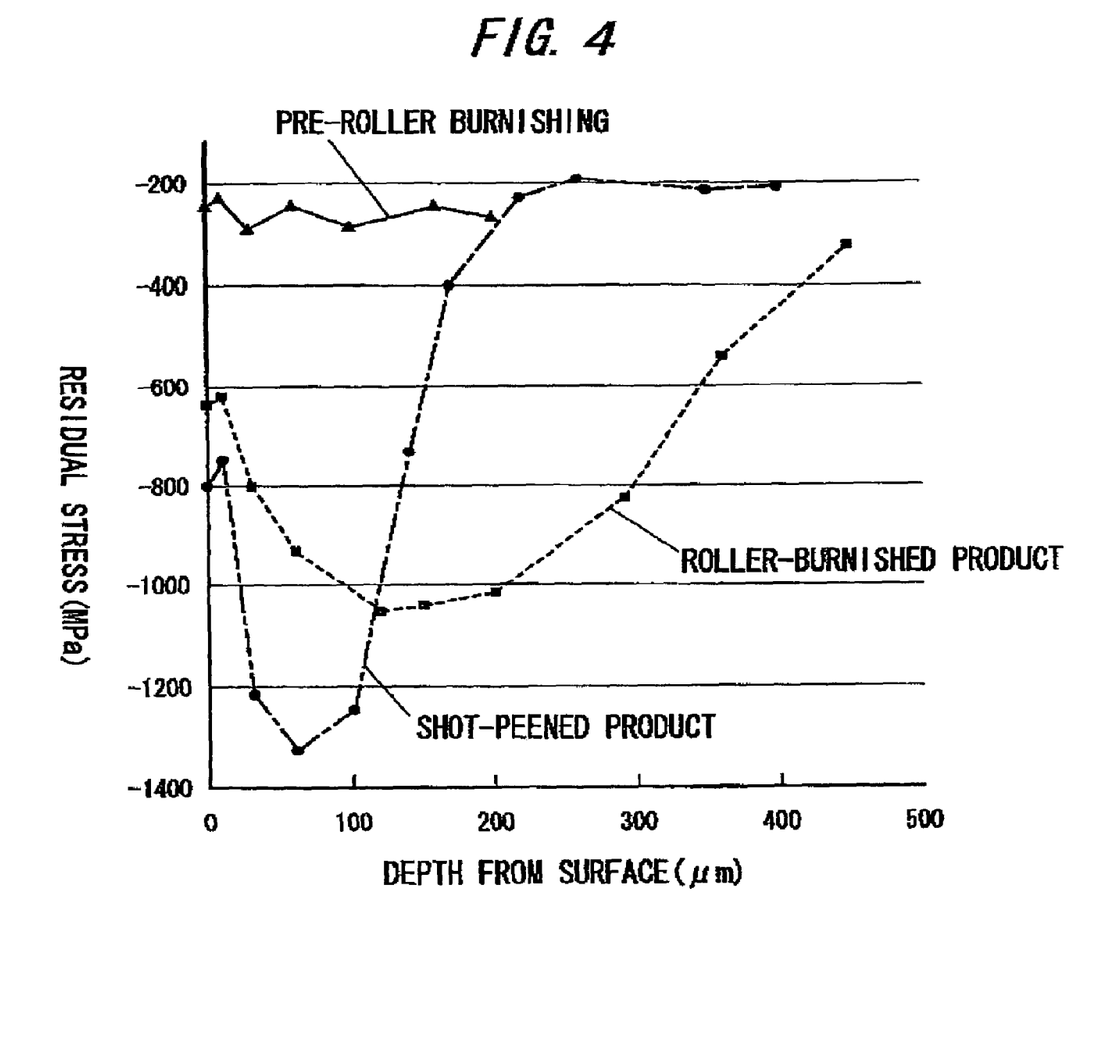
FIG. 4 is a graphical representation of measurement results of the compressive residual stress of the inner race of the roller bearing as determined at individual depths from the surface of the inner race.

FIG. 4 is a graphical representation of measurement results of the compressive residual stress of the race 1c as determined at individual depths from the surface thereof. For comparison purpose, the figure also shows measurement results of the compressive residual stress of the race un-subjected to the roller burnishing and those of the race finished by grinding and then shot peened. As apparent from FIG. 4, the roller burnished race 1c has the compressive residual stress of 1000 MPa or more at depths of 0.1 mm to 0.2 mm from its surface and besides, is hardened by burnishing to a point roughly twice as deep as a point to which the shot peened race is hardened.

A method for manufacturing the outer ring 2 is essentially the same as the aforementioned manufacturing method for the inner ring 1. The roller burnishing of the race 2c of the outer ring 2 is also performed the same way as that of the inner ring 1. That is, after the blank B is heat treated, the race 2c is finished by grinding and then is roller burnished.

The inner ring 1 and the outer ring 2 thus manufactured can achieve the increased fatigue strengths of the races 1c, 2c thereof, because the races 1c, 2c are subjected to the roller burnishing, thereby attaining the compressive residual stress therein and also achieving the surface hardness of HRC65 or more and the center-line average surface roughness Ra of 0.1 μm or less. According to the embodiment, in particular, the races 1c, 2c have the compressive residual stress of 1000 MPa or more at depth of at least 0.15 mm from their surfaces and hence, the fatigue strength of the races 1c, 2c can be increased more effectively. Furthermore, the races 1c, 2c have the hardness of HRC60 or more at depth of at least 0.2 mm from the surface thereof, so that the fatigue strength of the races 1c, 2c can be increased even more effectively. Therefore, the service life of the roller bearing assembled with the aforesaid inner ring 1 and outer ring 2 may be dramatically extended as compared with that of the conventional products. Specifically, a life test was conducted on each of the aforesaid inner ring 1 and outer ring 2 assembled in a bearing of a type number JIS-6206. The sample bearing was tested in both a clean oil and a contaminated oil (foreign-substance containing oil) under the following conditions. The test results indicate that the bearing tested in the clean oil exhibits a service life three times as long as that of the conventional products formed from a bearing steel, and that the bearing tested in the contaminated oil exhibits a service life twice as long as that of the conventional products. In addition, what is required is to subject the races 1c, 2c to the roller burnishing, which requires a nominal cost.

<Life Test Conditions>

(1) Life tester: KS Radial Life Load Tester (2) Radial load: 9709 N/brg (3) Number of rotation: 1800 rpm (4) Lubrication; #10 turbine oil bath (5) Oil temperature: natural temperature rise (to about 85° C.)

(6) Test scheme: 2 sets×5 times, test on a sudden-death basis

While the above embodiment uses the bearing steel as a material for the inner ring 1 and the outer ring 2, the material is not limited to this. The invention may also be practiced using any other steel for bearing manufacture such as carburized steel. In the above roller bearing, only the race of either one of the inner ring 1 and the outer ring 2 may be subjected to the roller burnishing according to the conditions under which the roller bearing is used.

Second Embodiment

Figure 5:
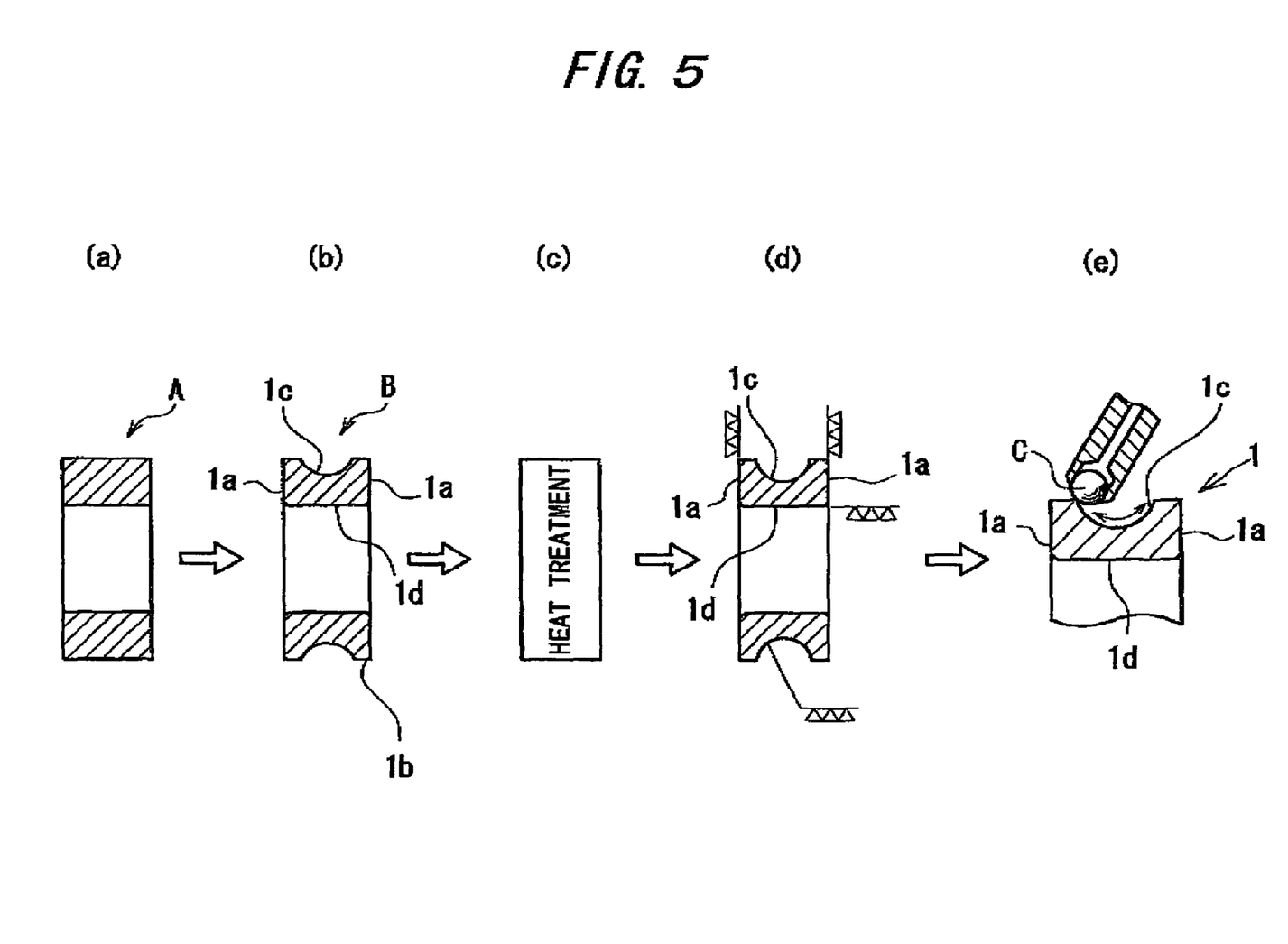
FIG. 5 is a group of diagrams showing the steps of a method for manufacturing a bearing raceway member according to a second embodiment of the invention.

FIG. 5 is a group of diagrams showing the steps of a method for manufacturing a bearing raceway member according to a second embodiment of the invention. The figure illustrates a case where the manufacturing method is applied to the inner ring 1 of the roller bearing. First, an annular material A (see FIG. 5(a)) formed from JIS-S55C or a carbon steel for machine structural use is cut by turning whereby an end face 1a, an outer periphery 1b, a race 1c, an inner periphery 1d and the like are formed into predetermined shapes, respectively (see FIG. 5(b)). Next, a blank B thus shaped by cutting is subjected to a so-called bulk heat treatment so as to be hardened to a hardness of HRC55 or so (see FIG. 5(c)). Thereafter, the end faces 1a, the race 1c and the inner periphery 1d of the blank B thus heat treated are finished by grinding to predetermined precisions (see FIG. 5(d)).

When the process of finishing by grinding is completed, a surface of the race 1c is roller burnished (see FIG. 5(e)). The roller burnishing is accomplished by moving the mirror-surfaced ceramic ball C along an axial sectional face of the race 1c as holding the ball in rolling contact therewith, the ball pressed against the race 1c with high pressure. In the roller burnishing process, burnishing conditions including the burnish amount, the pressure to be applied and the like are so selected as to allow the race 1c to achieve a hardness of Hv800 or more at depth of at least 0.2 mm from the surface thereof; a compressive residual stress of 800 MPa or more at depth of at least 0.15 mm from the surface thereof or more preferably a compressive residual stress of 800 MPa or more at depth of at least 0.2 mm from the surface thereof.

Figure 6:
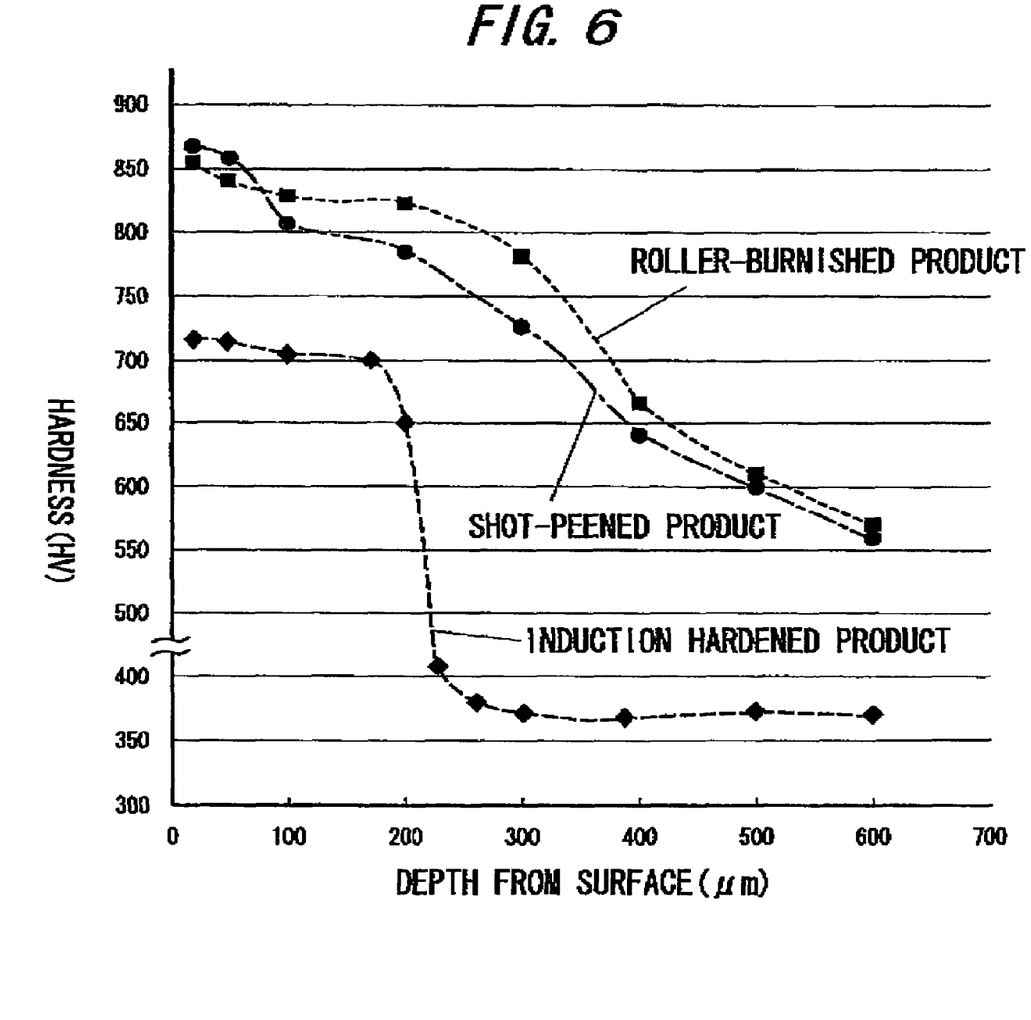
FIG. 6 is a graphical representation of measurement results of the hardness of an inner race of a roller bearing as determined at individual depths from a surface of the inner race, the roller bearing fabricated using the manufacturing method according to the second embodiment hereof.
Figure 7:
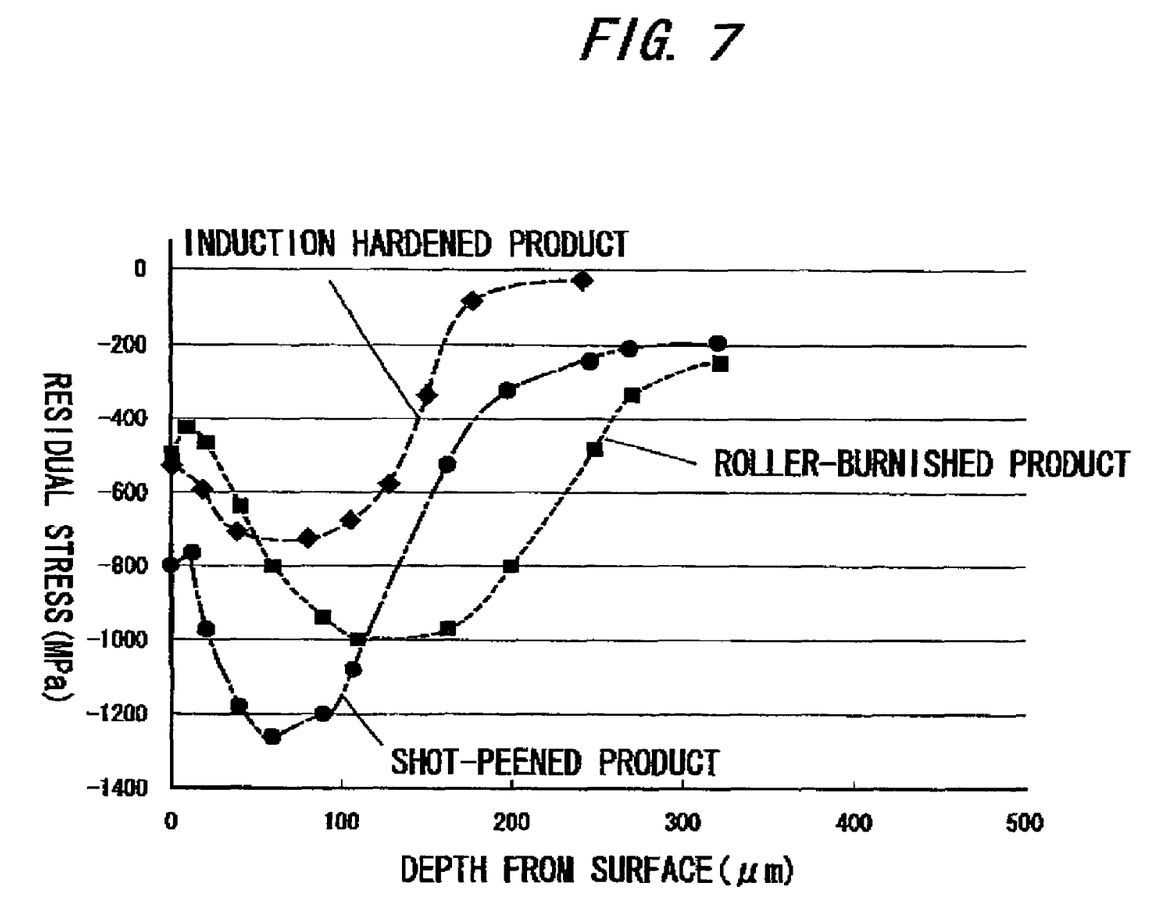
FIG. 7 is a graphical representation of measurement results of the compressive residual stress of the inner race of the roller bearing as determined at individual depths from the surface of the inner race, the roller bearing fabricated using the manufacturing method according to the second embodiment hereof.

FIG. 6 is a graphical representation of measurement results of the hardness of the race 1c as determined at individual depths from the surface thereof after the aforementioned roller burnishing process. FIG. 7 is a graphical representation of measurement results of the compressive residual stress of the race 1c as determined at individual depths from the surface thereof. For comparison purpose, the figures also show measurement results of a race induction hardened, and those of a race shot peened. As apparent from FIG. 6, the roller burnished race 1c is much harder than the induction hardened product and the shot peened product, as achieving the hardness of Hv800 or more at depth of at least 0.2 mm from its surface. As apparent from FIG. 7, the above race 1c has the compressive residual stress of 800 MPa or more at depth of at least 0.15 mm from its surface and besides, is hardened by burnishing to a point roughly twice as deep as a point to which the shot peened race is hardened.

In addition, the surface roughness of the race 1c can be decreased by the roller burnishing. The present inventors have confirmed from the test that the maximum surface roughness (Rmax) of the race can be decreased to ½ or less of the pre-process surface roughness thereof.

The inner ring 1 manufactured by the aforementioned method has its race 1c hardened by the roller burnishing so as to achieve the hardness of Hv800 or more at depth of at least 0.2 mm from the surface thereof. Because of the increased hardness coupled with the decreased surface roughness of the race 1c, the race 1c can be increased in the fatigue strength more effectively than the conventional products which are not roller burnished. According to the embodiment, in particular, the race 1c may be increased in the fatigue strength even more effectively because the race 1c has the compressive residual stress of 800 MPa or more at depth of at least 0.15 mm from its surface. Hence, a deep groove ball bearing assembled with the above inner ring 1 can achieve a dramatically increased service life as compared with that of the conventional products. Specifically, a life test was conducted on the aforesaid inner ring 1 used as an inner ring of the bearing of the type number JIS-6206. The sample bearing was tested in the clean oil. The test results demonstrate that the sample bearing exhibits a service life substantially comparable to that of a bearing of the same type number which is formed from a bearing steel (SUJ-2).

A variety of carbon steels for machine structural use are usable as the material for forming the raceway member according to the embodiment. Particularly, in a case where a carbon steel having a carbon content of 0.42 wt % or more, such as S45C, S50C and S55C according to the JIS Standards, is used as the material, the resultant bearing can achieve a service life substantially comparable to that of a roller bearing formed from a steel for bearing manufacture such as a bearing steel or carburized steel. On the other hand, the aforesaid blank B may also be hardened by induction hardening. In this case, what is required is to harden at least the race 1c by heat treatment.

Third Embodiment

Figure 8:
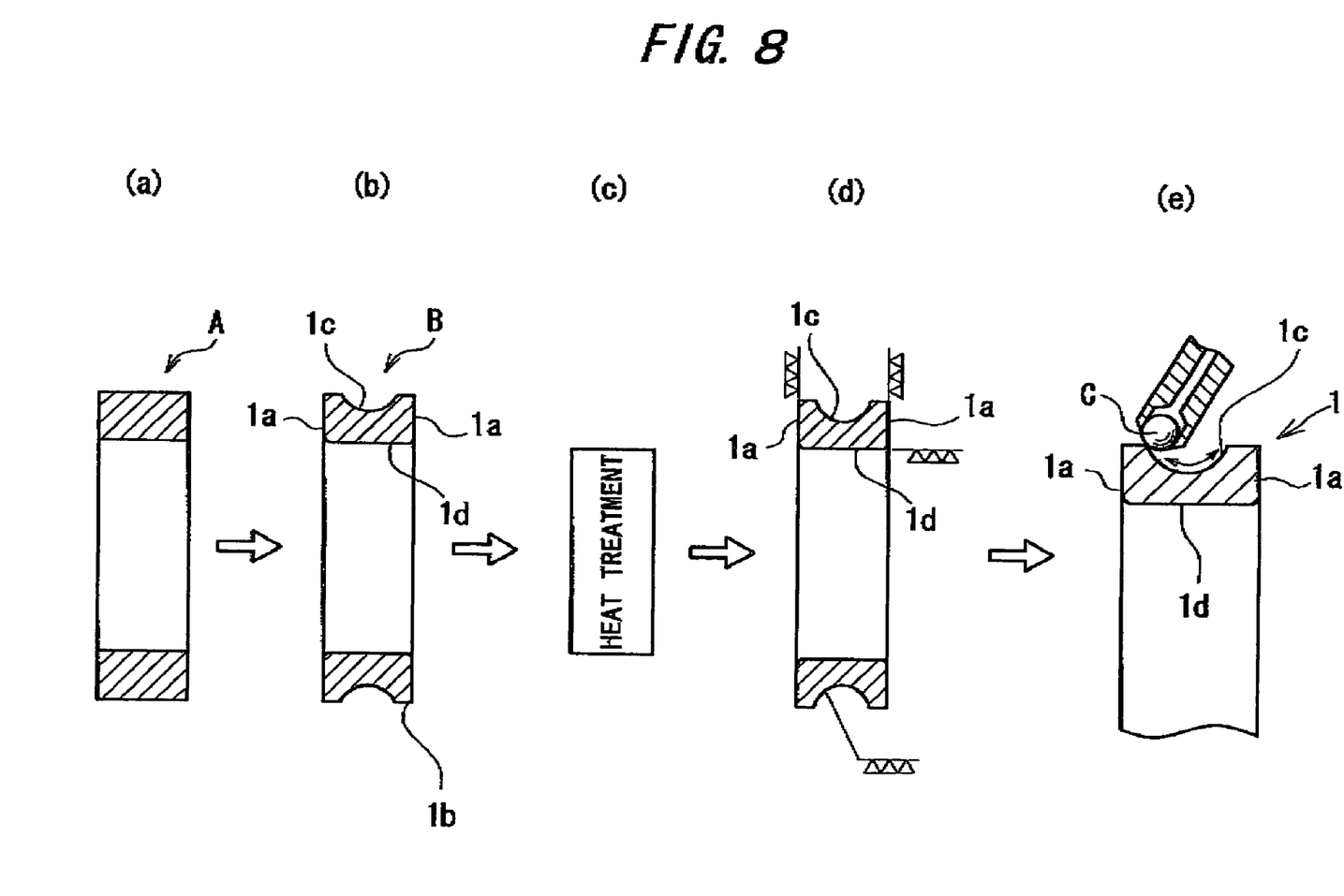
FIG. 8 is a group of diagrams showing the steps of a method for manufacturing a bearing raceway member according to a third embodiment of the invention.

FIG. 8 is a group of diagrams showing the steps of a method for manufacturing a bearing raceway member according to still another embodiment of the invention. The figure illustrates a case where the manufacturing method is applied to an inner ring 1 of a roller bearing used under a condition that the inner ring 1 is in contact with the rolling element at a maximum surface pressure of 300 MPa or more. First, an annular material A (see FIG. 8(a)) formed from a case hardening steel (steel for carburizing) (equivalent to SAE4320) is cut by turning whereby an end face 1a, an outer periphery 1b, a race 1c, an inner periphery 1d and the like are formed into predetermined shapes, respectively (see FIG. 8(b)). Subsequently, a blank B thus shaped by cutting is subjected to a heat treatment including carburizing and quenching so as to be hardened to a surface hardness of say HRC60 or more (see FIG. 8(c)). Thereafter, the end faces 1a, the race 1c and the inner periphery 1d of the blank B thus heat treated are finished by turning to predetermined precisions (see FIG. 8(d)). This turning process is performed the same way as the conventional process. Hence, the race 1c has a center-line average surface roughness Ra of 0.35 µm or more. Incidentally, the end faces 1a and the inner periphery 1d of the blank B may also be finished by grinding.

When the finishing process is completed, the surface of the race 1c is roller burnished (see FIG. 8(e)). The roller burnishing is accomplished by moving the mirror-surfaced ceramic ball C along an axial sectional face of the race 1c as holding the ball in rolling contact therewith, the ball pressed against the race 1c with high pressure. In the roller burnishing process, burnishing conditions including the burnish amount, the pressure to be applied and the like are so selected as to allow the race 1c to achieve a center-line average surface roughness Ra of 0.25 µm or less; a compressive residual stress of 1000 MPa or more at depth of at least 0.2 mm from the surface thereof; and a hardness of Hv700 or more at depth of at least 0.2 mm from the surface thereof.

Figure 9:
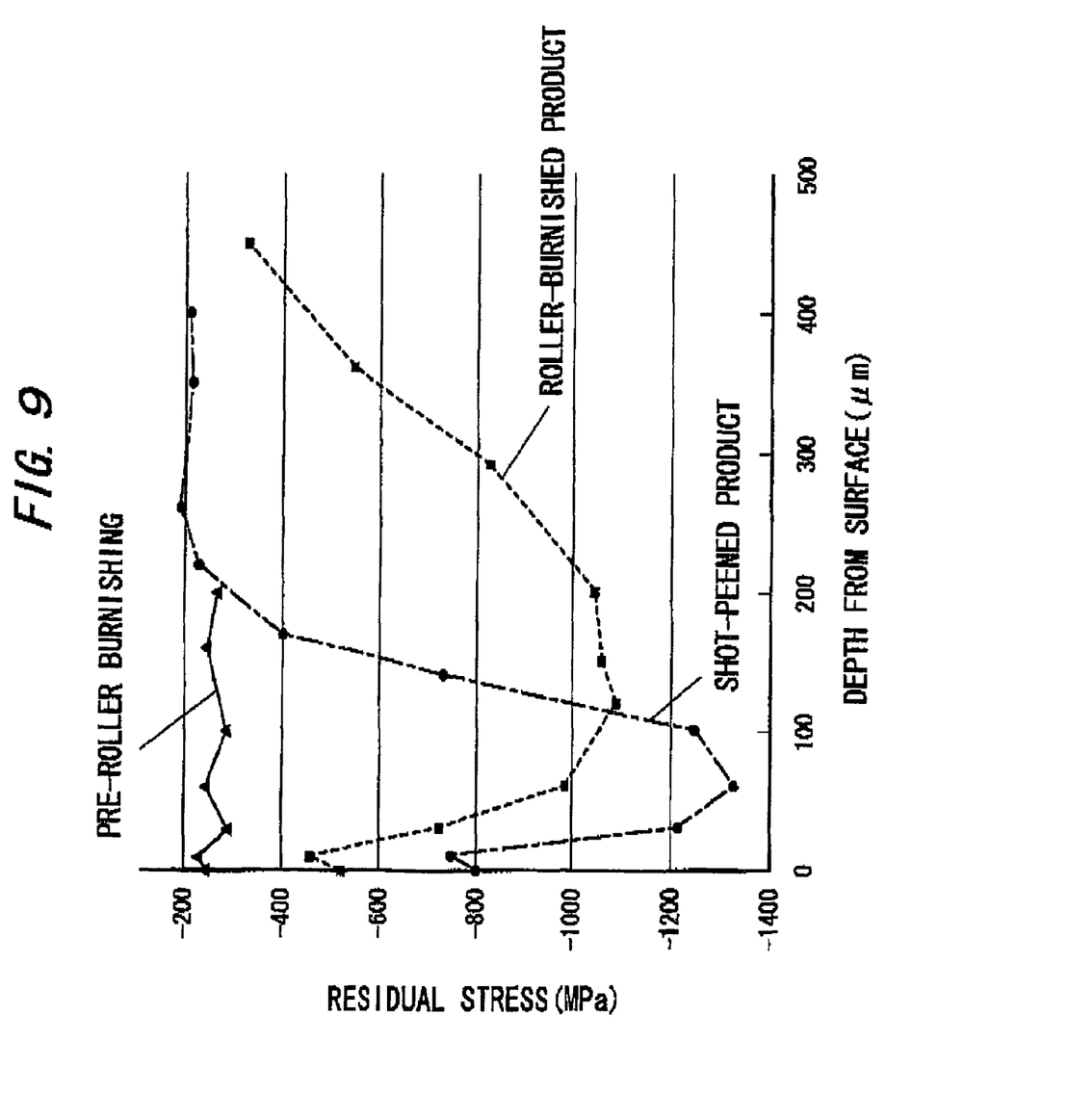
FIG. 9 is a graphical representation of measurement results of the compressive residual stress of an inner race of a roller bearing as determined at individual depths from the surface of the inner race, the roller bearing fabricated using the manufacturing method according to the third embodiment hereof.

FIG. 9 is a graphical representation of measurement results of the compressive residual stress of the roller burnished race 1c as determined at individual depths from the surface thereof. For comparison purpose, the figure also shows measurement results of the compressive residual stress of the race un-subjected to the roller burnishing and those of a race finished by turning and then shot peened.

As apparent from FIG. 9, the roller burnished race 1c has the compressive residual stress of 1000 MPa or more at depth of at least 0.2 mm from its surface and besides, is hardened by burnishing to a point roughly twice as deep as a point to which the shot peened product is hardened.

Figure 10:
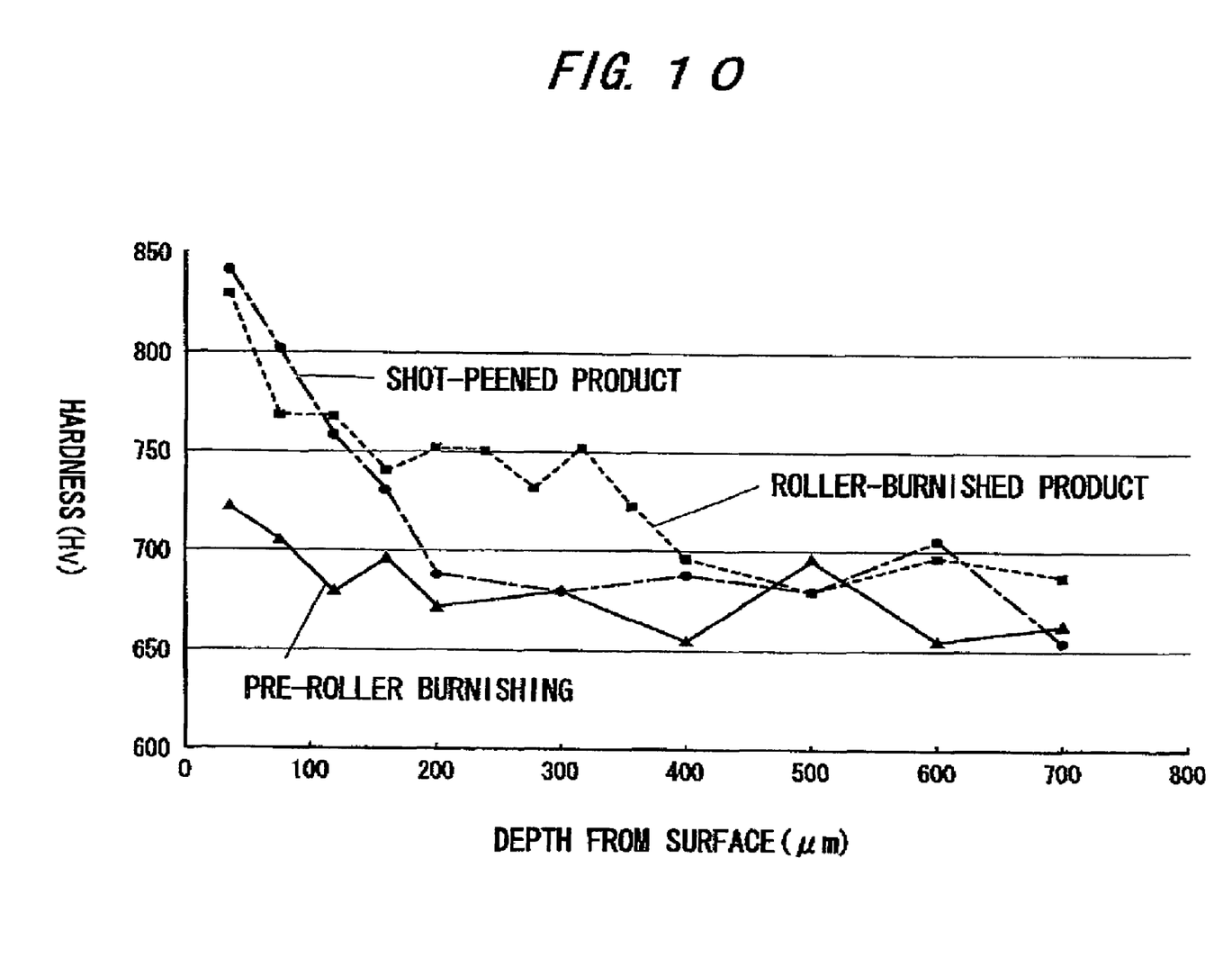
FIG. 10 is a graphical representation of measurement results of the hardness of the inner race of the roller bearing as determined at individual depths from the surface of the inner race, the roller bearing fabricated using the manufacturing method according to the third embodiment hereof.

FIG. 10 is a graphical representation of measurement results of the hardness of the roller burnished race 1c as determined at individual depths from the surface thereof. For comparison purpose, the figure also shows measurement results the race un-subjected to the roller burnishing and those of the race finished by turning and then shot peened.

As apparent from FIG. 10, the roller burnished race 1c is much harder than the race un-subjected to the roller burnishing and the shot peened product, as achieving the hardness of Hv700 or more at depth of at least 0.2 mm from its surface. Thus, the race 1c is effectively increased in the fatigue strength.

In the inner ring 1 manufactured in the aforementioned manner, the race 1c has its surface roughness decreased to the center-line average roughness Ra of 0.25 µm or less by the roller burnishing. Therefore, when used under the condition that the surface of the race 1c is in contact with balls as the rolling element at the maximum contact pressure of 300 MPa or more, the inner ring 1 is capable of maintaining a favorable lubrication between the race and the balls. Furthermore, the inner ring has the compressive residual stress of 1000 MPa or more at depth of at least 0.2 mm from the surface of the race 1c. This eliminates a potential risk of occurrence of tensile residual stress at the surface of the race 1c. Because of these advantages coupled with the fact that the race 1c is hardened to some depth by the roller burnishing, a ball bearing assembled with the aforesaid inner ring 1 is dramatically increased in the service life as compared with the conventional products. Specifically, a life test was conducted on the aforesaid inner ring 1 used as an inner ring of the bearing of the type number JIS-6206. The sample bearing was tested under a contact surface pressure of 350 MPa. The test results demonstrate that the sample bearing exhibits a service life roughly 3.5 times the service life of the conventional products.

Fourth Embodiment

In the third embodiment, the race $1c$ of the blank B hardened by heating is finished by turning to the predetermined precisions. Alternatively, the turning process may be replaced by rough grinding or the condition of the turning process may be loosened so that the race $1c$ may have a center-line average surface roughness Ra of 0.2 μm or more. In this case, the race $1c$ is finished and then, the surface thereof is roller burnished the same way as in the foregoing whereby the race $1c$ has a center-line average surface roughness Ra of 0.15 μm or less; a compressive residual stress of 1000 MPa or more at depth of at least 0.2 mm from the surface thereof; and a hardness of Hv700 or more at depth of at least 0.2 mm from the surface thereof. As to this embodiment, as well, it is confirmed that the bearing can be increased in the service life just as in the foregoing embodiments.

While the third and fourth embodiments use the carburized steel as the material for the raceway member, the material is not limited to this. The invention may also be practiced using a bearing steel such as SUJ-2. On the other hand, the blank may also be hardened by induction hardening. In this case, what is required is to harden at least the race by heating and quenching.

The second to fourth embodiments illustrate the cases where the roller burnishing is performed on only the inner ring which tends to suffer a short service life because of a severe contact condition. In any of the above embodiments, as a matter of course, the manufacturing method of invention is applicable not only to the inner ring of the roller bearing but also to the outer ring thereof.

In any of the foregoing embodiments, the invention may preferably be applied to a manufacturing method of a variety of bearing raceway members including the race, which are used under high pressure conditions and which include, for example, a cross shaft as an inner ring of a spider joint for use in a drive shaft for steel machines, a cup as an outer ring of the spider joint, and the like.

The invention claimed is:

1. A method for manufacturing an inner ring of a roller bearing, comprising the steps of:
    working a material formed from a steel for bearing manufacture into predetermined shapes to form at least a race of the inner ring of the roller bearing in order to produce a blank for forming the inner ring;
    hardening by heating at least the race of said blank;
    finishing the race of said blank hardened by heating to predetermined precisions; and
    roller burnishing said finished race by holding a ball in rolling contact therewith, as the ball is pressed against the race with high pressure, thereby hardening the race,
    wherein a steel for bearing manufacture is used as said material, and
    wherein the race is subjected to said roller burnishing, thereby achieving a hardness of HRC65 or more at a surface thereof and a center-line average roughness Ra of 0.1 μm or less at the surface thereof and achieving a hardness of HRC60 or more at a depth of at least 0.2 mm from the surface thereof.

2. A method for manufacturing according to claim 1, wherein the race of the inner ring has a compressive residual stress of 1000 MPa or more at depth of at least 0.15 mm from the surface thereof.

* * * * *